Patented Apr. 20, 1937

2,077,447

UNITED STATES PATENT OFFICE 2,077,447

PROCESS OF CHILLPROOFING AND STABILIZING BEERS AND ALES

Leo Wallerstein, New York, N. Y.

No Drawing. Application December 29, 1934, Serial No. 759,738. Renewed January 26, 1937

7 Claims. (Cl. 99—48)

The present invention relates to improvement in beers, ales, and other fermented malt beverages.

In Patents No. 995,824 and No. 995,825 to Leo Wallerstein, dated June 20, 1911, there are disclosed methods of producing improved bottled beers, which possess great stability and do not become turbid or cloudy even when placed on ice for considerable periods.

The former patent relates to the utilization of pepsin, or other proteolytic enzymes derived from the gastric secretions of mammals, while the latter patent relates to the addition of papain derived from papaw and bromelin derived from the fruit of the pineapple.

In chill-proofing the beers or ales according to the process of these patents it was customary to use enzyme preparation which contains but one of the enzyme preparations mentioned and to use the enzyme in its normal condition of activity.

These enzymes are generally active in fairly acid concentrations, pepsin being very active at about pH 2 to 3, while papain is very active at a pH of about 4 to 5 above.

I have now discovered that when any of the enzymes above specifically mentioned, particularly pepsin, papain, malt enzyme, or bromelin, are mixed with other proteolytic enzyme products and particularly those enzyme products and preparations which have an optimum activity at substantially higher pH's and desirably with metabolic enzymatic products obtained upon the growth of certain types of bacteria, fungi, and/or molds, their action is substantially enhanced and a better chill-proofing and stabilization of the malt beverage is obtained with most economical utilization of the enzymes.

For example, it has been found that with such mixtures superior chill-proofing and stability will result as compared to the effect of the enzyme preparations singly, such superior results being obtained even with smaller quantities of said enzymes having less enzymatic power.

For example, the beer or ale treated with the combinations of the present invention will remain chill-proof for a much longer time, as for example, when it has been in a bottle for many weeks and months. And beers so treated will keep their brilliancy for long periods both at ordinary and low temperatures and even though they be subjected to repeated changes in temperature ranging from freezing up to room temperatures.

This desirable activity of the enzyme preparations is obtained when pepsin, papain, bromelin, and/or malt enzymes singly or in combination are mixed with metabolic enzyme materials preferably of the type having an optimum activity at a substantially higher pH and particularly derived from the cultivation of B. subtilis, B. mesentericus, B. mycoides, Aspergillus oryzae, Mucor delemar, Penecillium, and other similar bacilli, fungi, and molds.

In carrying out the present invention, enzyme mixtures such as those above referred to are added to beer, ale, or other malt beverage at any suitable stage in the production, preferably after boiling of the wort. While the addition may be made before, during or after fermentation, the addition of small proportions of the mixed proteolytic enzyme preparations after the main fermentation and during storage has been found satisfactory. It has also been found satisfactory to add these enzyme mixtures to the clarified beer shortly before bottling.

The preferred proportions include the addition of 1 to 10 grams of the combined enzyme preparation to each beer barrel of beer, each barrel containing 31 gallons of beverage. Of this 1 to 10 grams from 0.5 to 5 grams may consist of pepsin, papain, the malt enzyme and/or bromelin singly or in combination, while the other ½ to 5 grams may consist of the enzyme preparations derived from one or more of the above specified micro-organisms. The latter enzyme preparations should preferably not be used in the mixture in greater amounts than the former.

To describe several processes of preparing these metabolic compositions by way of example:

A malt wort of about 12% Balling is made by mashing barley malt with water. This malt wort is adjusted to a pH advantageous to the growth of the micro-organisms, for instance, to a pH of about 6.5 to 7.

The wort is then sterilized, for instance, by heating, under pressure, preferably to a temperature of about 120° C.

The sterilized wort is then cooled to 37 to 40° C. and inoculated with a culture of the desired micro-organism, such as B. subtilis and B. mesentericus. The inoculated wort is forced into a culture apparatus which was previously sterilized under such conditions as to avoid contamination.

As the development of these bacteria and the production of the desired metabolic products takes place most readily when growing same in comparatively thin layers or strata, it is advantageous to use a culture apparatus which is so constructed that the growing of these bacteria takes place in thin quiescent layers, for example, 1 to 3 inches in thickness, with exposure of as large a surface in proportion to the volume as possible. As these bacteria are aerobic it is necessary that apparatus is equipped to provide for sufficient aeration.

In preparing the wort which is used as a culture medium, I have found that the addition of small amounts of autolyzed yeast to the malt wort improves the growing of the bacteria, and also increases the yield in the desirable enzymatic substances.

Malt wort of the above gravity generally contains from 0.5% to 0.8% of proteins and I have found that the addition of sufficient autolyzed yeast extract to the malt wort to raise the protein content to 1.2% to 1.5% will greatly enhance the growing of the bacteria and increase the yields of the desired enzymatic products.

The growth in the culture apparatus is allowed to take place for about five to ten days and at temperatures ranging from about 37 to 45° C. During this time the bacterial growth reaches its maximum, and metabolic substances containing the enzymatic products are secreted by the organisms and pass into the bacterial liquor.

After this growing period, the liquor is separated from the bacterial skin. For example, the bacterial skin may be removed by high speed centrifuges or by filtration. It must be done, however, under conditions to prevent infection. This is best accomplished either by operating at very low temperatures or preferably by the addition of suitable antiseptics, such as sulfites or alcohol, to the bacterial liquor.

It is desirable to concentrate the active principles contained in the bacterial liquor and to use the concentrated preparation which is more stable and may readily be stored, packaged and transported.

In order to prepare such a concentrated product, the active enzymatic principles contained in the bacterial liquor are precipitated from this liquor by the addition of alcohol or acetone. As a general rule from one to two volumes of these precipitating agents are sufficient for every volume of bacterial liquor to be precipitated.

Another method of concentrating these enzymatic substances consists in salting out the active principles by the addition to the metabolic liquors of about an equal volume of a saturated ammonium sulfate solution. In either method of concentration the precipitated material is separated by centrifuging or filtration and dried at a lower temperature, preferably at about less than 40° C.

When Aspergillus, Mucor or Penicillium are cultivated to produce the enzymatic products the following procedure is found to be satisfactory.

A culture medium, preferably consisting of comminuted or broken grains of cereals, such as wheat, corn, oats and barley, from which a greater part of the starchy material has been removed, is suitably moistened with water and thoroughly sterilized. The culture medium may consist of bran shorts or middlings. Other media may be utilized, such as residues from beer brewing, alcohol fermentation processes, and so forth.

After the sterilization of the culture media, as for example with steam, the spores of the desired fungus or mold are sown therein. The moisture of the media may vary, but preferably ranges between 40% to 60% by weight.

After sowing the fungus seed spores upon the culture media, the entire mass is preferably formed into a bed, although this is not essential. This bed is maintained in a moist atmosphere at a uniform temperature varying from 35° to 45° C. and preferably not exceeding the latter limit.

The growth may be continued while agitating the mass by stirring or the mass may be permitted to lie in quiescent condition. In the former case the thickness of the mass preferably is increased to 2 to 3 feet, while in the latter case the bed of material is kept fairly thin, as for example, from 1 to 2 inches in thickness to provide for aeration.

The fungus or mold growth is permitted to continue from 3 to 5 days and then the enzymatic preparation is extracted by lixiviating the mass with water.

After this extraction, the liquor is separated from the fungi or mold growth and the culture material. For example the growths and culture material may be removed by high speed centrifuges or by filtration. It must be done, however, under conditions to prevent infection. This is best accomplished either by operating at very low temperatures and/or preferably by the addition of suitable antiseptics, such as sulfites or alcohol, to the metabolic liquor.

It is desirable to concentrate the active principles contained in the metabolic liquor, in the manner previously described, and to use the concentrated preparation.

Only comparatively small amounts of these concentrated metabolic enzymatic materials are needed to accomplish the enhancement of the pepsin, papain or other protease.

With mixed enzymes or combined enzyme preparations of the above character, the acidity of the beverage being treated and its temperature will have considerable effect upon the activity of the enzyme mixture. For example, with mixtures containing pepsin having an optimum activity at about pH 2 to 4 and being active up to about 65° C.; papain and bromelin having an optimum activity of about pH 4 to 6 and being active up to about 70° C.; fungi enzymes having an optimum activity at about pH 4 to 5 and being active only up to about 50° C.; and bacterial enzymes having an optimum activity of about pH 6 to 8 and being active only up to about 50° C., it is very possible to regulate the effect of the mixed enzyme preparation upon the beverage by controlling its acidity and temperature.

Mixtures of enzymes, as described above, not only give improved chill-proofing and stability with more economical utilization of enzymes but in addition most satisfactorily modify carbohydrate and protein materials in the beverage to give improved flavor, taste, and quality. For example, enzyme preparations derived from the growth of molds and fungi may be combined with enzyme preparations derived by the growth of bacteria, as mentioned above.

The various combinations of enzymes disclosed according to the present application have a better action not only in chill proofing the beer, but also in otherwise improving its quality than would be expected from the additive effect of the enzymes themselves.

Apparently the metabolic enzymes derived from bacterial and fungi growth not only enhance each other's action, but they greatly enhance the action of plant enzymes such as papain and animal enzymes such as pepsin.

The present application is similar in subject matter to the applications Ser. Nos. 668,986, filed May 2, 1933, now Patent No. 2,011,095; and 672,039, filed May 20, 1933, now Patent No. 2,011,096; which relate to process of treating, stabilizing, maturing and/or ripening beers and ales by the additions of metabolic products derived from certain types of bacilli and molds. Enhanced enzyme mixtures containing pepsin and papain with or without one or more of said metabolic products other than those claimed specifically in the present application, are more fully covered in the copending applications Ser. Nos. 668,987, filed May 2, 1933; 82,924, filed June 1, 1936; and 82,925, filed June 1, 1936, all of which are being issued upon even date herewith.

What is claimed is:

1. The process of chill-proofing and stabilizing malt beverages which comprises adding thereto an enzymatic composition including pepsin and a bacterial metabolic enzymatic material, said bacterial metabolic enzymatic material being produced by cultivation of bacillus selected from the group consisting of *Bacillus subtilis* and *Bacillus mesentericus*.

2. The process of chill-proofing and stabilizing alcoholic fermented malt beverages which comprises adding to the beverage after substantial completion of the fermentation and before it has been stabilized and before it is chill-proof, a preparation including at least one proteolytic enzyme which is very active at a pH of about 2 to 3 and at least another which is very active at a pH of about 4 to 5, said first mentioned proteolytic enzyme consisting of a pepsin preparation and said second mentioned enzyme being selected from a group of enzymes produced by the cultivation of *Bacillus subtilis* and *mesentericus*.

3. In the process of chill-proofing and stabilizing a beverage which includes alcoholic fermentation of a boiled and cooled malt wort, adding a preparation including at least one proteolytic enzyme which is very active at a pH of about 2 to 3 and at least another which is very active at a pH of about 4 to 5, said addition to the material being effected before it has been stabilized and before it is chill-proof, said first mentioned proteolytic enzyme consisting of a pepsin preparation and said second mentioned enzyme being selected from a group of enzymes produced by the cultivation of *Bacillus subtilis* and *mesentericus*.

4. The process of chill-proofing and stabilizing malt beverages which comprises adding thereto an enzymatic composition including pepsin and a bacterial metabolic enzymatic material, said bacterial metabolic enzymatic material being produced by cultivation of bacillus selected from the group consisting of *Bacillus subtilis* and *Bacillus mesentericus*.

5. The process of chill-proofing and stabilizing malt beverages which comprises adding thereto an enzymatic composition including pepsin and a bacterial metabolic enzymatic material being produced by cultivation of bacillus selected from the group consisting of *Bacillus subtilis* and *Bacillus mesentericus*, said composition being added to the malt beverage after the boiling of the wort.

6. The process of chill-proofing and stabilizing malt beverages which comprises adding thereto an enzymatic composition including pepsin and a bacterial metabolic enzymatic material, said bacterial metabolic enzymatic material being produced by cultivation of bacillus selected from the group consisting of *Bacillus subtilis* and *Bacillus mesentericus*, said composition being added during the fermentation.

7. The process of chill-proofing and stabilizing malt beverages which comprises adding thereto an enzymatic composition including papain, pepsin and a bacterial metabolic enzymatic material, said bacterial metabolic enzymatic material being produced by cultivation of bacillus selected from the group consisting of *Bacillus subtilis* and *Bacillus mesentericus*.

LEO WALLERSTEIN.